L. E. LA BOMBARD.
BLANK FEEDER.
APPLICATION FILED DEC. 12, 1921.
Reissued Feb. 28, 1922. 15,293.
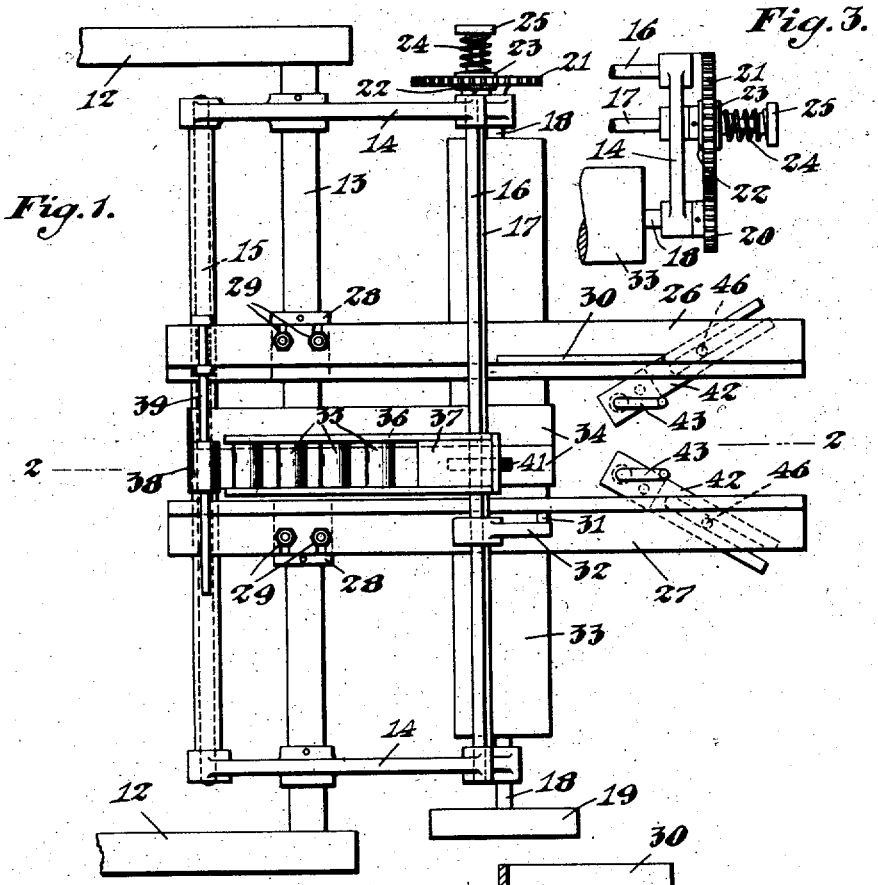
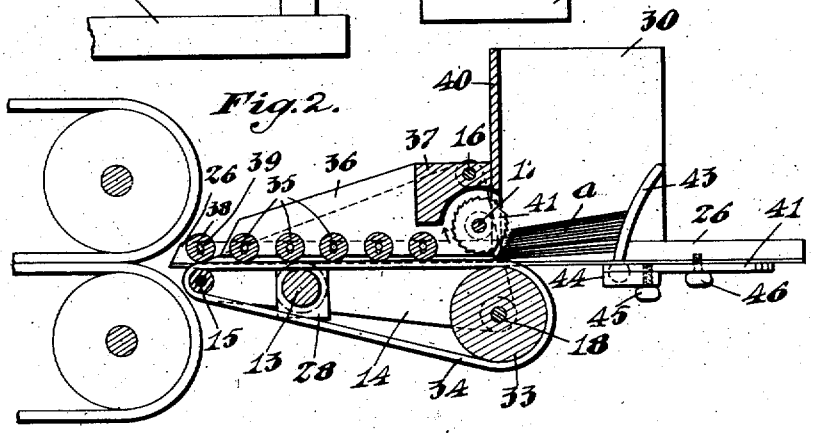
INVENTOR.
Leon E. La Bombard
BY W. W. Harrison
ATTORNEY.

UNITED STATES PATENT OFFICE.

LEON E. LA BOMBARD, OF CHELSEA, MASSACHUSETTS, ASSIGNOR TO SPECIALTY AUTOMATIC MACHINE COMPANY, OF CHELSEA, MASSACHUSETTS, A CORPORATION OF MASSACHUSETTS.

BLANK FEEDER.

15,293. Specification of Reissued Letters Patent. Reissued Feb. 28, 1922.

Original No. 1,352,284, dated September 7, 1920, Serial No. 161,432, filed April 12, 1917. Application for reissue filed December 12, 1921. Serial No. 521,931.

*To all whom it may concern:*

Be it known that I, LEON E. LA BOMBARD, a citizen of the United States, and resident of Chelsea, in the county of Suffolk and State of Massachusetts, have invented certain new and useful Improvements in Blank Feeders, of which the following is a specification.

This invention relates to feeding mechanisms such as are employed in connection with machines for folding paper blanks to make boxes or envelopes, or in connection with printing presses, and my invention refers particularly to such feeding mechanisms as detach the blanks or sheets singly from the bottom of a pile.

In feeders of this type there is a liability of a let up in the regularity of the feed as the height of the pile in the supply hopper decreases, this resulting from the reduction of pressure due to the gradual diminution of weight of the superposed blanks, and the consequent reduction of feed-effect of the friction device operating against the under surface of the lowermost blank.

The chief object of my invention is to provide a feeder which will increase the certainty of the blanks following each other regularly spaced, without liability of skipping any blanks, so long as there are any blanks at all to be fed from the supply hopper.

With this and other objects in view, my invention consists in the improvements substantially as hereinafter described and claimed.

Of the accompanying drawings:

Figure 1 is a plan view illustrating my improvements in one embodiment thereof.

Fig. 2 represents a section on line 2—2 of Fig. 1, and showing also portions of carrier belts for delivering the blanks from the feeder to whatever machine is to operate on said blanks.

Fig. 3 is a detail elevation looking from the right of the upper part of Fig. 1.

Similar reference characters indicate similar parts in all of the views.

Portions of the frame of the machine to which my improved feed mechanism is attached are indicated at 12, said portions being connected by a cross bar or tie rod 13. Two frame brackets 14 are secured to the tie rod 13, and may be additionally held in fixed position by any suitable means. Two tie rods 15, 16, connect the brackets 14, and two shafts 17, 18, are mounted in said brackets. The shaft 18 has a pulley 19 at one end for a driving belt, and at the other end carries a pinion 20 (Fig. 3) meshing with a gear 21 loosely mounted on shaft 17 between a collar 22 fixed to the shaft and a friction disk 23 splined on said shaft. A spring 24 coiled on the shaft 17 is confined between the hub of friction disk 23 and a collar 25 adjustably secured to the shaft. Any equivalent connections that will cause shaft 18 to frictionally drive shaft 17 may be substituted for those just described.

Two horizontal bars 26, 27, are suitably supported, as by blocks 28 mounted on tie rod 13 and adapted to be secured in adjusted position thereon, according to the width of the blanks, by screws 29. The bar 26 carries an upright plate 30 as a guide for one side of the pile of blanks, the other side being guided by a vertical rod 31 (shown only in Fig. 1) secured to an arm 32 having its hub laterally adjustable on tie rod 16.

Secured to shaft 18 is a drum 33. Mounted on said drum and on tie rod 15 or on small pulleys carried by the tie rod are one or more feed belts 34 of rubber or other suitable material to frictionally engage and carry the blanks. To hold the blanks in operative contact with said belt or belts, a series of gravity rolls 35 are loosely mounted in a frame comprising side plates 36 and a block 37, said plates and block being mounted on tie rod 16. A supplemental roll 38, above the delivery end of feed belt 34, is carried by a small shaft 39 supported by the bars 26, 27.

Secured to block 37, either rigidly or so that it may be vertically adjusted, is a plate or gage strip 40 to cooperate with the plate 30, rod 31, and the rear pins presently described, in holding the stack or pile of blanks in position, said parts constituting a hopper for a pile of blanks *a* (Fig. 2). It is not necessary to illustrate the member 40 as adjustable, because such adjustable devices are well known in this art, the blanks being fed one by one through a narrow space between the lower edge of the member 40 and the friction feeder, the latter being, in this case, the belt or belts 34. The said narrow space constitutes an outlet throat the predetermined vertical width of which is always sufficient to permit the passage of one, and only one, blank at a time, the lower end of the gage strip 40 serving as a positive barrier to the passage of the blank next above the bottom one.

Secured to shaft 17, and accommodated in a recess in the lower portion of strip or plate 40 and block 37, is a presser for the front edges of the blanks, the presser illustrated consisting of a toothed or milled wheel 41. In Figures 1 and 2 the extent of projection of the toothed wheel through the slot or recess in the strip or plate 40 is somewhat exaggerated in the interest of clearness of illustration. It is not essential however that it shall project so far that more than one tooth at a time shall act to press toward the feeder those blanks which present edge portions between it and the feeder. I do not limit myself to a toothed wheel. Any device which will serve to exert continuous and substantially uniform pressure on edge portions of blanks in a hopper so as to urge them successively toward a feeder which removes them from the hopper constitutes a mechanical equivalent of the toothed wheel.

Adjustably secured to each of the bars 26, 27, is a strip 42 to support a pin 43 having a ball-shaped lower end mounted in a socket formed in the inner end of said supporting strip and in a cooperating clamp piece 44. By means of clamp screws 45 and set screws 46, I provide for universal movement of the pins 43 to any position to engage the rear edges of the blanks of any shape, in a pile, and the then setting of said pins fixedly in such position, so that the weight of the blanks will cause their rear edges to engage inclined portions of the pins and result in the blanks, as they reach lowermost positions, being directed or shifted forward. This renders it certain that their front edges will be engaged by the presser.

By setting the pins 43 in positions turned one-quarter from the positions shown in Figure 1, they will present straight vertical guides for the rear edges of the blanks, and still render it certain that the front edges of the blanks will successively be engaged by the presser.

In operation blanks *a* are placed in the hopper in position so that one or more near the bottom of the pile will be engaged by the presser, the front edge of the bottom blank resting on the feeder belt or belts 34 and in line with the narrow opening or throat below gage strip 40, the lower end of which arrests the next blank until the bottom one has passed out. The shaft 17 is frictionally driven to cause the presser to rotate, or tend to rotate, in the direction of the arrow in Figure 2, so that at least one tooth will engage an edge portion of a blank and urge that blank, and those under it, toward the feeder. The force exerted by the presser on the front edge portions of the blanks is readily adjustable by varying the pressure of the friction-clutch-spring 24. When a presser such as shown is employed, it is preferable to so adjust spring 24 as to permit an intermittent slipping of gear 21 relatively to friction disk 23. It would be objectionable to permit a sawing of the presser into the blanks. The slipping just referred to results in the blanks holding the presser stationary until each bottom one is fed out and the pile is free to descend a distance equal to the thickness of one blank. Such descent is instantly effected, with little or no liability of delay or hesitation in the feed, because gravity is aided by the presser. The pins 43 or any equivalent thereof aid in rendering it certain that the blanks will be in position to be acted upon by the presser.

It will now be understood that while the toothed member 41 illustrated rotates intermittently, it is constantly acting as a presser, and it not only insures the same regularity or uniformity of feed when the pile of blanks is small and of light weight as when the hopper is full and the pile heavy, but it also insures proper feed when the front edges of the blanks are curled up as is frequently the case. The dieing out of blanks from a pile of sheets often causes the blanks, or some of them, to be more or less curved instead of flat. And sometimes the dies are dull and the edges of the blanks are rough or curled. By employing a presser operating as described, all such blanks as well as those which are flat and have smooth edges are properly acted upon because the presser renders it certain that the front edges of all blanks will be forced, in regular succession, into proper position, with the front edge of the bottom blank in line with the outlet throat and bearing on the feeder, while the rigid obstruction presented by the lower end of the gage strip 40 absolutely prevents the passage of the next blank above.

The lateral adjustment of the bars 26, 27, and the ball-and-socket mounting of the pins 43, enables the feeder to operate properly on blanks of widely different sizes, shapes and qualities, without requiring any manual attention further than the occasional depositing of a stock of blanks in the hopper.

When the pins 43 are adjusted substantially as indicated in Figure 2, the blanks are mainly supported only at their front and rear edges, the front edge of the bottom blank being supported by the belt or belts 34 driven by the drum 33, the pins 43 serving to hold the bottom blank (and those above it) inclined upwardly toward the rear and therefore causing the blanks to have a constant tendency to move forward. Preferably the pins 43, when employed, are not straight but are curved slightly so that the tendency of the blanks to be crowded forward will be gradually lessened as they move down. Another advantage of this structure of pins is that the blanks nearest the bottom automatically separate as indicated in Figure 2 and admit air between them. The result is that there is little or no adhesion between the lower blanks and consequently the bottom blank is freer to be fed than is the case where the lower blanks are in contact throughout their areas.

Whether pins 43 of the type illustrated are employed or not, so long as the stock of blanks are held in such position that their front edge portions will be successively engaged by the presser, there will be an uninterrupted downward pressure exerted on the blank or blanks which contact with the presser, and said pressure will be transmitted through lower blanks to the bottom one which is bearing on the feeder 34, so that said bottom one, and only the bottom one, will be fed through the narrow outlet or throat between the lower end of the strip 40 and said feeder 34 whether the edge of the bottom blank is curled or not. The action may be illustratively explained by stating that if the presser 41 were to be removed, the pressing operation could be performed manually by an attendant using the nails of two or more fingers to successively engage edge portions of the blanks adjacent the strip 40 and exert downward pressure.

As has been stated, the rubber belts 34 are mounted upon and driven by the drum 33. The gate or gage strip 40 is directly above the drum or radial to the axis thereof. The reason for this will now be explained.

When a rubber belt forms one side of a throat or gateway through which blanks are to pass singly, any variation in the thickness of the belt so as to vary the vertical width of the throat interferes with the operation of the feeder, as by permitting the passage of two blanks together or the jamming of two blanks in the throat. If the belts 34 were driven at the outer ends, as by pulleys carried by a shaft in the location of the rod 15, the upper stretches of the belts would be subject to a more or less fluctuating stretching action as the blanks pass successively, because said stretches are pulled instead of pushed. Friction belts are always more or less elastic; when of rubber (the best material for blank feeding) very much so. In the present structure there is so much of the belt or belts 34 in contact with the driving drum 33 that the portion of the feeder belt which is below the gage strip 40 is under no pulling strain whatever and therefore the thickness of that portion remains constant and the height of the passageway for the blank urged forward by the belt remains constant and the same as that for which the gage strip was first set or adjusted.

A particular feature of my invention resides in the fact that when a stock of flatwise contacting blanks are placed in the hopper and are then successively removed through the throat or passageway under the strip 40, such removal permits the blanks above the lower one to approach the feeder somewhat intermittently. The speed of such approach varies according to whether the blanks are thick or thin. The friction drive of the presser however is such that each tooth thereof, which constitutes a blank engaging member, has a normal tendency to move toward the feeder at a rate of speed faster than the removal of blanks by the feeder permits the engaged blank to approach the feeder. At any time, more blanks can be added to the top of the stock or pile without interrupting the action of the entire feeder.

Having now described my invention, what I claim is:

1. A blank feeding mechanism comprising side guides for a pile of blanks, a friction feeder to act successively on the lower blanks of the pile, pressing means to engage edge portions of blanks in the pile, and means having a constant tendency to actuate the pressing means to urge the blanks toward said feeder.

2. In a blank feeding mechanism having a hopper for a pile of blanks and a friction feeder for removing the blanks singly therefrom, a wheel opposite the front edges of the blanks, and means having a constant tendency to rotate the wheel in a direction to urge said edge portions toward the feeder.

3. In apparatus of the character described, a feeder, a movable member above the feeder, means for supporting a pile of blanks with the front edge portions of the lower blanks of the pile contacting with said movable member, and means for actuating the said movable member to urge said edge portions toward the feeder.

4. In apparatus of the character described, a hopper for a pile of blanks, means for feeding out the lower blank of such pile, and means for pressing front edge portions of the lower blanks of the pile toward the feeding out means, said means comprising a wheel and frictional driving mechanism for constantly urging said wheel in its operative direction.

5. In apparatus of the character described, a hopper for a pile of blanks, means for feeding out the lower blank of such pile, and means for uniformly pressing the front edge portions of the lower blanks of the pile toward the feeding out means, said means comprising a toothed disk, a shaft therefor, and frictional driving mechanism for said shaft.

6. A blank feeding mechanism having front and rear supports for a pile of blanks, the front support being movable to feed the lower blank of the pile, a wheel above said front support, and means for continuously actuating the wheel to cause it to press front edge portions of the lower blanks toward said movable front support.

7. A blank feeding mechanism having front and rear supports for a pile of blanks, the front support being movable to feed the lower blank of the pile, a wheel above said front support, and means for actuating the wheel to cause it to press front edge portions of the lower blanks toward said movable front support, the rear support comprising a pair of independently adjustable pins.

8. A blank feeding mechanism having front and rear supports for a pile of blanks, the front support being movable to feed the lower blank of the pile, and means for pressing front edge portions of the lower blanks toward said movable front support, the rear support comprising a pair of universally mounted and independently adjustable pins.

9. In apparatus of the character described, a constantly movable feeder, means for holding a pile of blanks in position for them to be taken singly from the pile, and a constantly movable member engaging front edge portions of blanks in the pile to exert a uniform tendency to press said front edge portions toward the feeder.

10. A machine having a feeder for removing blanks from a stock of contacting blanks, characterized by a constantly existing outlet or throat of predetermined width and by a blank engaging member having a normal tendency at the time of feed to move the blanks toward the feeder to urge them successively into line with said outlet or throat at a rate of speed faster than the removal of blanks by the feeder permits the engaged blank to approach the feeder.

11. A machine having a feeder for removing blanks from a stock of contacting blanks, characterized by a constantly existing outlet or throat of predetermined width and by a member located to engage blanks between the extremities of said stock and having a normal tendency at the time of feed to move the blanks toward the feeder to urge them successively into line with said outlet or throat at a rate of speed faster than the removal of blanks by the feeder permits the engaged blank to approach the feeder.

12. A blank feeding mechanism having means for supporting a stock of blanks and provided with a constantly existing outlet of predetermined width to permit the passage of one blank at a time, a feeder to effect such passage through the outlet, a movable member in position to engage edge portions of the blanks successively, and means for actuating said movable member at the time of feed to urge said edge portions toward the feeder and into line with said outlet.

13. In apparatus of the character described, a feeder, a movable member above the feeder, a rigid barrier at a predetermined distance from the feeder, means for supporting a pile of blanks with edge portions of lower blanks of the pile in position to be successively engaged by said movable member, and means for actuating the said movable member at the time of feed to urge said edge portions toward the feeder and into line with the space below said barrier.

14. A blank feeding mechanism comprising guides for a pile of blanks, a feeder to act successively on the lower blanks of the pile, a rigid barrier at a predetermined distance from the feeder, and pressing means in position to successively at the time of feed engage portions of the blanks in the pile to urge the blanks toward said feeder and into line with the space below said barrier.

15. A blank-feeding mechanism including a rotary drum, a friction blank-forwarding belt driven thereby, a hopper having an outlet gate directly above the axis of said drum, and means for exerting pressure on the blanks to urge their forward edges downward.

16. A blank-feeding mechanism including a blank-forwarding belt, a driving roll for the belt, and a hopper for blanks to be forwarded by said belt, said hopper having an outlet gate directly above the axis of the belt-driving roll, said roll and gate being relatively positioned to provide said gate at the termination of contact of the belt with the roll.

17. A blank-feeding mechanism including a blank-forwarding belt, a driving roll for the belt, and a hopper for blanks to be forwarded by said belt, said hopper having a front barrier comprising a gate strip mounted directly above the axis of the belt-driving roll, said roll and gate being relatively positioned to provide said gate at the termination of contact of the belt with the roll.

In testimony whereof I have affixed my signature.

LEON E. LA BOMBARD.